B. SAWYER.
COTTON PLANTER.
APPLICATION FILED MAR. 5, 1912.

1,067,066. Patented July 8, 1913.

Bertie Sawyer,
Inventor

Witnesses by C. A. Snow & Co.
Attorneys

UNITED STATES PATENT OFFICE.

BERTIE SAWYER, OF EMPIRE, GEORGIA.

COTTON-PLANTER.

1,067,066.  Specification of Letters Patent.  Patented July 8, 1913.

Application filed March 5, 1912. Serial No. 681,698.

*To all whom it may concern:*

Be it known that I, BERTIE SAWYER, a citizen of the United States, residing at Empire, in the county of Dodge and State of Georgia, have invented a new and useful Cotton-Planter, of which the following is a specification.

This invention relates to cotton planters and more particularly to mechanism for transmitting motion from the supporting wheel of the planter to the seed agitating element within the seed hopper.

One of the objects of the invention is to provide improved means, constantly under the control of the operator, whereby the transmission of power to the agitating means can be controlled.

With the foregoing and other objects in view which will appear as the description proceeds, the invention resides in the combination and arrangement of parts and in the details of construction hereinafter described and claimed; it being understood that changes in the precise embodiment of the invention herein disclosed, can be made within the scope of what is claimed, without departing from the spirit of the invention.

In the accompanying drawings the preferred form of the invention has been shown.

Figure 1:
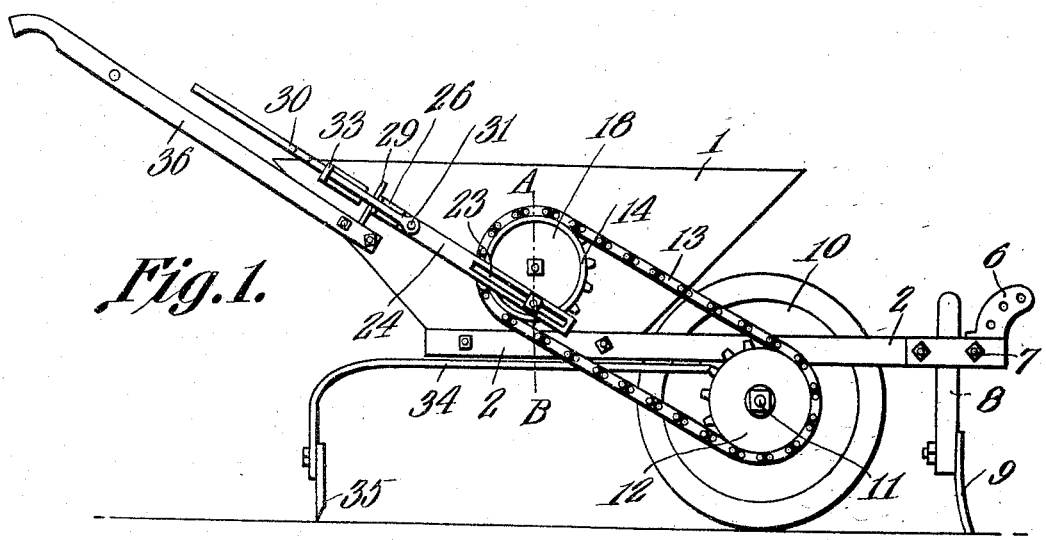
Figure 2:
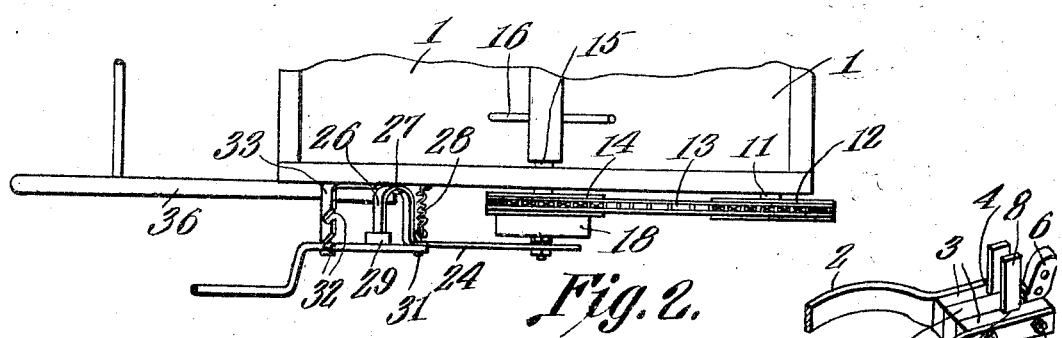
Figure 3:
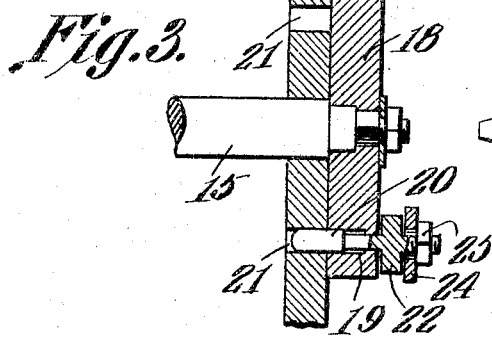
Figures 4, 5:
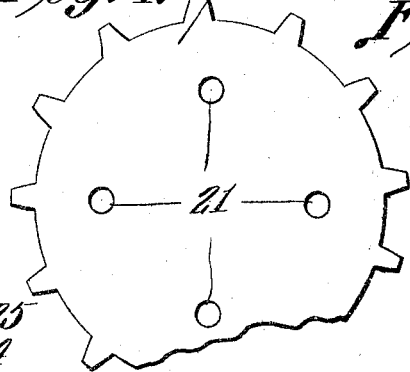

In said drawings:—Figure 1 is a side elevation of the machine. Fig. 2 is a plan view of the power transmitting and controlling mechanism. Fig. 3 is an enlarged section through the power controlling mechanism, said section being taken on the line A—B, Fig. 1. Fig. 4 is an elevation of a portion of the sprocket of said mechanism. Fig. 5 is a perspective view of the front end of the frame and showing the means provided for connecting the furrow opener to the frame.

Referring to the figures by characters of reference, 1 designates a seed box or hopper secured between the rear ends of side members 2 which converge forwardly and are secured to opposite sides of blocks 3 having recesses in their inner faces, as indicated at 4, there being a central block 5 interposed between the recessed faces of the blocks 3 and provided, at its front end, with a clevis 6. The several blocks are connected to the side members 2 by means of bolts 7 or the like extending transversely therethrough, these bolts being adapted to be tightened so as to bind the blocks upon parallel standards 8 which are extended through the recesses 4. These standards are provided, at their lower ends, with a furrow opener 9. A wheel 10 is mounted between the side strips 2 back of the furrow opener 9 and its axle 11 is adapted to rotate and supports the side strips or members 2. This axle has a sprocket 12 secured to one end portion thereof, said sprocket being adapted to transmit motion, through a chain 13, to another sprocket 14. This last named sprocket is mounted to rotate loosely upon a shaft 15 extending through the lower portion of hopper or box 1 and having seed agitating arms 16 or the like extending therefrom. A disk 18 is secured to and rotates with the shaft 15 and has a transverse opening 19 therein adjacent its periphery and in which a coupling pin 20 is slidably mounted. A series of openings 21 extends transversely into the sprocket 14 and any one of these openings is adapted to receive the pin 20 when the pin is projected beyond the disk 18. That end of the pin 20 which projects beyond the outer face of disk 18 has a collar 22 which is preferably integral therewith. The longitudinally slotted end portion 23 of an arm 24 is loosely engaged by the outwardly projecting end portion of pin 20 and bears against the collar 22, the said arm being held at all times in engagement with the pin by a nut 25 or the like engaging the end of the pin. Arm 24 extends from rocker 26 mounted on the side of the hopper 1 and held loosely thereto by a stud 27. A spring 28 connects the arm 24 to the side of the hopper and serves to hold said arm normally pressed against the collar 22 and the pin 20 normally into engagement with the sprocket 14. That end of the rocker 26 farthest removed from arm 24 has a cross head 29 slidably engaged by a lever 30. This lever is fulcrumed at one end on the arm 24, as shown at 31 and its other end portion is adapted to be placed in engagement with either of a pair of notches 32 formed in an arm 33 outstanding from the hopper 1. Spring strips 34 are secured, at their forward ends, to the lower faces of the side strips 2 close to the bearings of the axle 11 and these strips extend rearwardly and thence downwardly and are secured, at their rear ends, to a leveling board 35 such as is commonly employed in connection with cotton planters. As shown in Fig. 1 the spring strips are normally out of contact with the side strips except at their points of attachment thereto. Handles 36 may be connected to the hopper 1 and extended upwardly and rearwardly therefrom.

It is to be understood that under normal conditions the pin 20 is pressed by spring 28 into engagement with the sprocket 14, said pin resting within one of the openings 21. Thus it will be seen that when the planter is moved forward wheel 10 will transmit motion through chain 13 to sprocket 14 and, as the sprocket is coupled to the disk 18 by means of pin 20, it will be obvious that the shaft 15 and the agitating arms 16 will thus be rotated. During this rotation of the disk 18, the pin 20 will oscillate arm 24 upon its pivot 27, the lever 30 being, at the same time, oscillated by the arm 24, said lever being at this time mounted within the outer notch 32. Should it be desired to stop the rotation of disk 18 and shaft 15, it is merely necessary to disengage the lever 30 from the outer notch and to press the lever inwardly toward the hopper 1 so as to bring it into engagement with the inner notch 32. Said lever will thus press on the head 29 and cause the arm 24 and the rocker 26 to shift on the stud 27, the free end of arm 24 pulling outwardly on the pin 20 and causing it to withdraw from the opening 21 in which it is seated. This withdrawal of the pin can of course be effected no matter what may be the position of the pin during the rotation of the disk. Thus it will be seen that the agitation of the cotton seeds is under the constant control of the operator.

What is claimed is:—

1. The combination with a shaft mounted for rotation, and a drive element loosely mounted on the shaft and adapted to rotate thereon, of a member secured to and revoluble with the shaft, said member lying close to one side of the drive element, a coupling pin slidable transversely through said member, there being openings within the drive element any one of which is adapted to receive the pin, a rocker mounted adjacent the said member, a longitudinally slotted arm extending from the rocker and engaging the pin, a head upon the rocker at that end remote from the arm, a lever fulcrumed upon the arm and slidably engaged by the head, and means for holding the lever against lateral movement, said lever constituting means for bearing against the head to tilt the rocker and withdraw the pin from engagement with the drive element irrespective of the angle of the arm relative to the lever.

2. The combination with a shaft, a revoluble drive element loosely mounted thereon, and a member secured to and revoluble with the shaft, said element having a plurality of apertures, of a wrist pin slidable transversely within said member and only seated in one of the apertures, a rocker, said rocker having a longitudinally slotted arm engaging the wrist pin, a pivot device engaging the middle portion of the rocker, a lever fulcrumed upon the arm, a head upon the rocker at that end remote from the arm and slidable upon the lever during the oscillation of the arm by the rotating member and wrist pin, and means for adjustably engaging and supporting the lever to limit the tilting movement of the rocker and arm.

3. The combination with a revoluble drive element having a plurality of apertures, a revoluble member adjacent thereto, and a pin slidable transversely within the member and normally seated in one of the apertures to couple the members together, of a rocker, a pivot device engaging an intermediate portion of the rocker, an arm extending from one end of the rocker and having a longitudinal slot into which the pin projects, a head at the other end of the rocker, a lever fulcrumed on the arm and bearing against the head, said head being adapted to reciprocate upon the lever during the oscillation of the arm by the rotating pin carrying member, and means engaging the lever for holding it pressed against the head to tilt the rocker and arm and withdraw the pin from the rotating element.

In testimony that I claim the foregoing as my own, I have hereto affixed my signature in the presence of two witnesses.

BERTIE SAWYER.

Witnesses:
W. J. TRIFT,
JNO. L. CRAVEY.

Copies of this patent may be obtained for five cents each, by addressing the "Commissioner of Patents, Washington, D. C."